S. CHRISTENSEN.
FISHHOOK.
APPLICATION FILED APR. 13, 1920. RENEWED APR. 12, 1922.

1,430,626.

Patented Oct. 3, 1922.

Sverre Christensen
INVENTOR

David E Lofgren

ATTORNEY

Patented Oct. 3, 1922.

1,430,626

UNITED STATES PATENT OFFICE.

SVERRE CHRISTENSEN, OF PORTLAND, OREGON.

FISHHOOK.

Application filed April 13, 1920, Serial No. 373,627. Renewed April 12, 1922. Serial No. 551,833.

*To all whom it may concern:*

Be it known that I, SVERRE CHRISTENSEN, a subject of the King of Norway, residing at Portland, in the county of Multnomah and the State of Oregon, have invented certain new and useful Improvements in Fishhooks, of which the following is a specification.

My invention relates to fish hooks, and the objects of my invention are to provide a fish hook that will hook a larger percentage of the fish that bite than the hook now in common use, that will hold the fish securely after hooking, and that may be sharpened from time to time by the use of a file or common whetstone and thus kept in good condition.

I attain these objects by means of the hook of peculiar design illustrated in the accompanying drawings, in which.

Similar numbers of reference refer to similar parts throughout the several views.

The barb 1 is located on the outside of the hook in place of on the inside as is the case with the hook now commonly in use, and is lower down on the bottom curve of the hook than usual.

Figure 1:
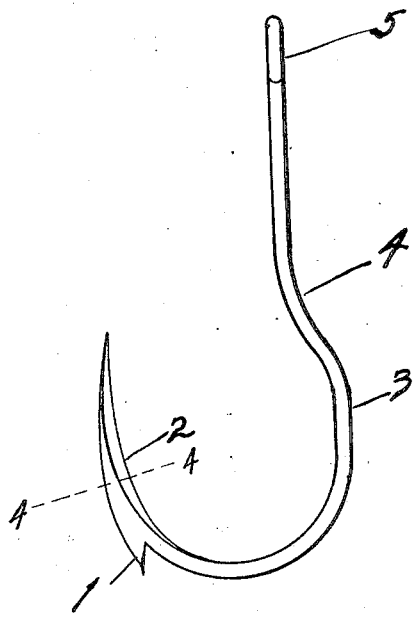
Fig. 1 is a plan view of the hook from the side.
Figure 2:
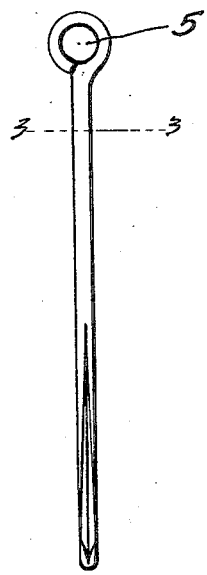
Fig. 2 is a plan view of the hook from the front, taken at right angles to the view shown in Fig. 1.
Figure 4:
Fig. 4 is an enlarged cross section of the hook or barb end on the line 4—4 of Fig. 1.
Figure 3:
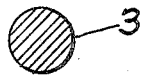
Fig. 3 is an enlarged cross section of the shank on the line 3—3 of Fig. 2.

The upturned end of the barb is triangular in section, as shown by Fig. 4, in order to present flat surfaces thus presenting three edges that may be easily sharpened to keep the point in good condition, which is very necessary when fishing.

The shank 3 is curved inward toward the point, as is indicated by the numeral 4, thus making the hook somewhat narrow at this point and assisting to hold the fish firmly in place when hooked.

An eye 5 is provided in the upper end of the shank 3 to fasten the line or leader to the hook, or the upper end of the shank may be left without an eye and the line or leader secured in the same manner as is common with trout hooks and flies.

It is understood that within the scope of what is claimed that changes may be made in the precise embodiment of my invention without departing from the spirit thereof.

Having thus fully described my invention, I claim, and desire to protect by Letters Patent:

1. In a fish hook the combination of a shank of circular cross section a hooked point of triangular cross section having on the exterior a triangular barb, said barb being so disposed as to be easily sharpened.

2. In a fish hook the combination of a shank of circular cross section, a point of triangular cross section said shank curving toward the point of the hook and thus narrowing the throat thereof, substantially as described.

SVERRE CHRISTENSEN.